(12) United States Patent
Meijs

(10) Patent No.: US 6,611,209 B2
(45) Date of Patent: *Aug. 26, 2003

(54) SIGNAL PROCESSING SYSTEM

(75) Inventor: Franciscus A. C. Meijs, Eindhoven (NL)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,489

(22) Filed: Jun. 25, 1998

(65) Prior Publication Data

US 2001/0052857 A1 Dec. 20, 2001

(30) Foreign Application Priority Data

Jun. 27, 1997 (EP) .............................................. 97201969

(51) Int. Cl.$^7$ ............................................... G08C 19/00
(52) U.S. Cl. ............................ 340/825.69; 340/825.72; 455/6.3; 345/327
(58) Field of Search .............................. 340/825.3, 10.4, 340/10.5, 10.51, 825.69, 825.72; 345/327, 734; 455/6.3; 348/734, 460; 725/139

(56) References Cited

U.S. PATENT DOCUMENTS 5,751,369 A * 5/1998 Harrison et al. ............. 348/552
5,880,769 A * 3/1999 Nemirofsky et al. ........... 348/12
5,900,867 A * 5/1999 Schindler et al. ............ 345/327
6,069,672 A * 5/2000 Claasen ....................... 348/734

FOREIGN PATENT DOCUMENTS

WO          9615629          5/1996

* cited by examiner

Primary Examiner—Edwin C. Holloway, III
Assistant Examiner—William Bangachon
(74) Attorney, Agent, or Firm—Laurie E. Gathman

(57) ABSTRACT

A signal processing system includes a signal processing device (8) and a portable information carrier (2). The signal processing device comprises a signal source selection device (11) having a number of preset positions. A preset position can be related to a signal source and a number of parameter values. With the aid of read means (1), write means (14) and the portable information carrier, the preselection settings can be exchanged between similar signal-processing devices. In a first memory section (4), the signal source names are related to specific data, such as a frequency or channel number. In a second memory section (5) and in memory of the portable information carrier, preset positions are related to the parameter values and to signal source names, which uniquely identify the signal sources within a given set of signal sources.

12 Claims, 3 Drawing Sheets

| SIGNAL SOURCE NAME | SPECIFIC DATA | PARAMETER VALUES (OPTIONAL) |
|---|---|---|
| TV1 | 30MHz | ... |
| TV2 | 40MHz | ... |
| ... | ... | ... |

| SIGNAL SOURCE NAME | SPECIFIC DATA | PARAMETER VALUES (OPTIONAL) |
|---|---|---|
| WNNN | 100.1 MHz | ... |
| WXYZ | 89.9 MHz | ... |
| ... | ... | ... |

| SIGNAL SOURCE NAME | SPECIFIC DATA | PARAMETER VALUES (OPTIONAL) |
|---|---|---|
| SONG1 | TRACK 1 | ... |
| SONG2 | TRACK 2 | ... |
| ... | ... | ... |

FIG. 2

| PRESET POSITION | SIGNAL SOURCE NAME | PARAMETER VALUES (OPTIONAL) |
|---|---|---|
| 1 | TV1 | ... |
| 2 | TV2 | ... |
| ... | ... | ... |

| PRESET POSITION | SIGNAL SOURCE NAME | PARAMETER VALUES (OPTIONAL) |
|---|---|---|
| 1 | WNNN | ... |
| 2 | WXYZ | ... |
| ... | ... | ... |

| PRESET POSITION | SIGNAL SOURCE NAME | PARAMETER VALUES (OPTIONAL) |
|---|---|---|
| 1 | SONG1 | ... |
| 2 | SONG2 | ... |
| ... | ... | ... |

FIG. 3

SIGNAL PROCESSING SYSTEM

BACKGROUND OF THE INVENTION

The invention relates to a signal processing system comprising:
- a portable information carrier,
- a signal processing device comprising:
  - a signal source selection device, having a plurality of logically arranged preset positions, for selecting one signal source from at least two available signal sources,
  - a control device for controlling the signal processing device and the signal source selection device,
  - read means for reading information from the portable information carrier,
  - a memory adapted to store, for at least one set of signal sources, at least one correspondence relationship between a preset position and a signal source.

The invention also relates to a method of processing signals, which method includes:
- the selection of a signal source from at least two available signal sources by means of logically arranged preset positions,
- the read-in of information from a portable information carrier.

Such a signal processing system is known from WO 96/15629. The known system includes a receiver, particularly a television receiver, and a remote control with a card reader for an information carrier. The information carrier is capable of storing data for each preset position, particularly data which determine whether the receiver is allowed to relay the signal source (particularly a television channel).

SUMMARY OF THE INVENTION

It is an object of the invention to provide a signal processing system of the type defined in the opening paragraph in which the correspondence relationship between a preset position and a corresponding signal source can be changed by means of information on the portable information carrier.

To this end the signal processing system in accordance with the invention is characterized in that:
- the memory comprises a first and a second memory section, the first memory section being adapted to store at least one correspondence relationship between a signal source and a signal source name which identifies the signal source within a set of signal sources, and the second memory section being adapted to store at least one correspondence relationship between a preset position and a signal source name,
- the portable information carrier is adapted to store at least one correspondence relationship between a preset position and a signal source name,
- the read means being adapted to read the correspondence relationships from the portable information carrier and store them in the second memory section.

As a result of these measures the correspondence relationships between the preset positions and the signal sources can be defined by means of data loaded from the portable information carrier. This enables a set of correspondence relationships to be installed in a simple manner.

For another embodiment of the signal processing system for each preset position it is possible to store also one or more parameter settings, for example volume of sound or picture contrast, on the portable information carrier and load these by means of the signal processing device.

In a further embodiment of the signal processing system parameter settings are stored on the portable information carrier in standardized form, which improves the compatibility with similar signal processing systems.

In a further embodiment of the signal processing system the signal processing system now also includes write means for writing correspondence relationships and parameter settings from the signal processing device onto the portable information carrier. As a result of this, a user can simply install his personal preferential settings on a plurality of similar signal processing systems.

The method in accordance with the invention is characterized in that
- the method also includes the unique identification of a signal source by means of a signal source name,
- the information on the portable information carrier includes at least one correspondence relationship between a preset position and a signal source name.

BRIEF DESCRIPTION OF THE DRAWINGS

These and other aspects of the invention will be described in more detail with reference to an embodiment given by way of example.

FIG. 2 shows the First Memory Section of the Signal Processing Device

FIG. 3 shows the Second Memory Section of the Signal Processing Device.

DETAILED DESCRIPTION OF THE PREFERRED EMBODIMENTS

Figure 1:
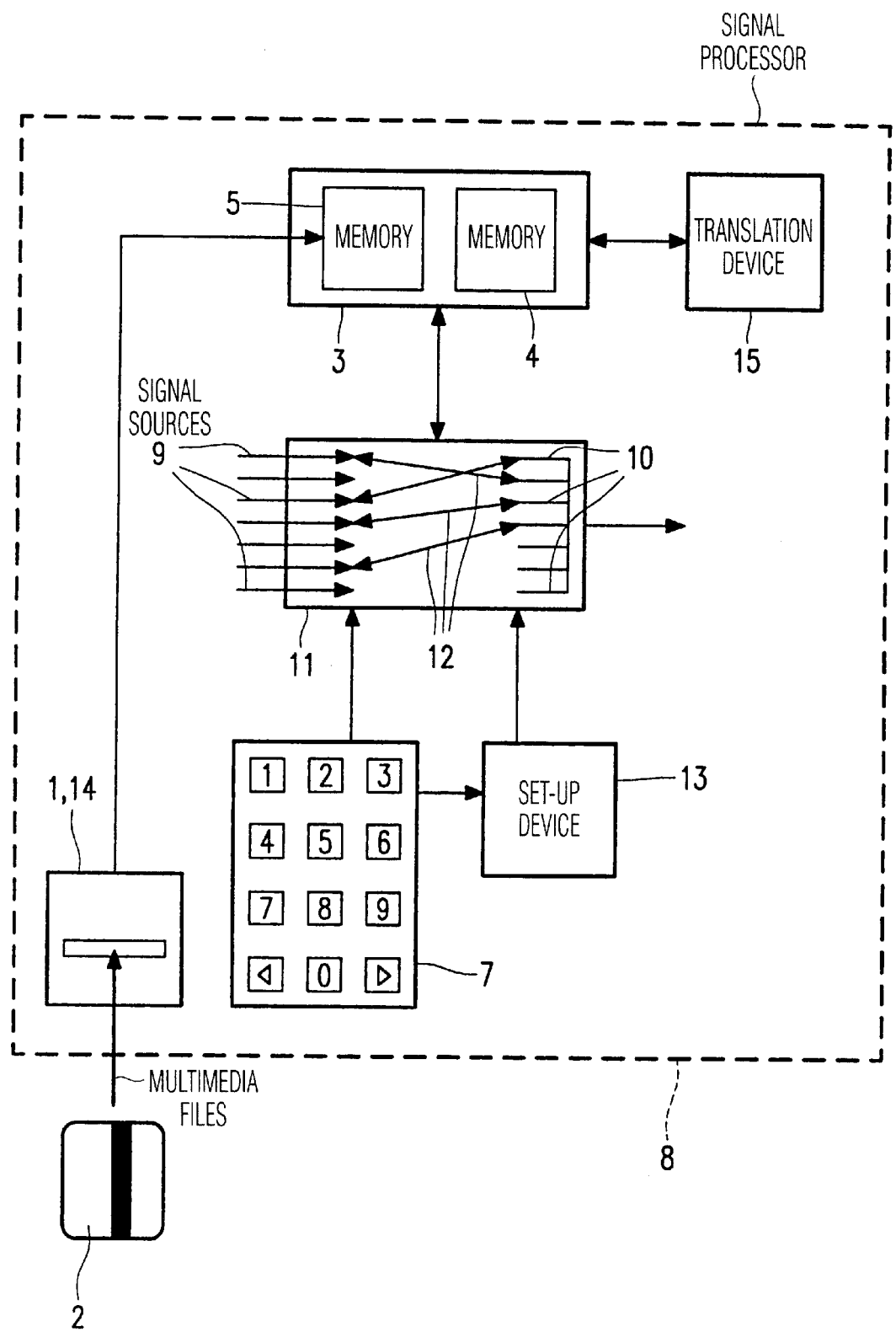
FIG. 1 shows a diagram of a signal processing system in accordance with the invention.

The system shown in the FIGURE comprises a portable information carrier 2 and a signal processing device 8. The signal processing device 8 comprises a signal source selection device 11, which has a plurality of logically arranged preset positions 10 which are linked to a plurality of signal sources 9 by correspondence relationships 12. The signal source selection device 11 can be operated by means of a control device 7. The correspondence relationships 12 are stored in a memory 3 having a first memory section 4 and a second memory section 5. The portable information carrier 2 can be read by read means 1, which are capable of loading information into the memory 3.

The signal sources 9 can be, for example, radio or television stations or multimedia files on a portable information carrier. If the signal sources 9 are radio or television stations the signal source selection device 11 can be a tuner of a radio or television receiver. If the signal sources 9 are multimedia files, the signal source selection device 11 can be a track selector of a CD player. By means of the correspondence relationships 12 a number of signal sources 9 are related to a number of preset positions 10. Several preset positions 10 may correspond to one of the signal sources 9.

The correspondence relationships 12 are stored in the memory 3. A correspondence relationship traditionally comprises a table as shown in Table 1.

TABLE 1

Traditional organization of correspondence relationships

| Preset position | Signal source name (optional) | Specific data | Parameter values (optional) |
|---|---|---|---|
| 1 | TV1 | 30 MHz | . |
| | | | . |
| 2 | TV2 | 40 MHz | . |
| . | . | . | . |
| . | . | . | . |
| . | . | . | . |

A preset position can be represented explicitly, as indicated in the first column of Table 1, or can be given implicitly by the sequence number of a row. In its simplest form such a table only has columns for the preset positions 10 and for specific data. If the signal sources 9 are radio or television stations the specific data can be frequencies or channel numbers. In that case a frequency and/or channel number is assigned to a preset position. Furthermore, a row may contain a signal source name, for example the name or identification code of a television station, as well as parameter values, for example picture and sound settings which apply specifically to the radio or television station corresponding to the row.

In the signal processing system in accordance with the invention, however, the table has been split into two tables, the first memory section 4 storing a table in accordance with FIG. 2 and the second memory section 5 storing a table in accordance with FIG. 3.

Again a preset position can be represented explicitly, as indicated in the first column of FIG. 3, or can be given implicitly by the sequence number of a row.

Since the specific data have not been included in the table in the second memory section 5, this table can be exchanged between a plurality of signal processing systems in accordance with the invention by means of a portable information carrier, provided that the signal source names are identical in the respective systems. As a result of this, preselection settings can be installed simply on a plurality of systems even though the specific data for these systems differ from one system to another. A situation which occurs frequently is, for example, that a TV station is known by one specific name throughout a large area but that the frequency at which the TV station can be received depends on the cable network or the transmission antenna from which the TV signal transmitted by the TV station is received. The portable information carrier 2 and the second memory section 5 may comprise a plurality of sets of preselection settings, for example for use in different regions, for the use of different frequency ranges, or for a division into different categories.

For reading the portable information carrier 2 the signal processing system in accordance with the invention comprises read means 1 capable of reading the correspondence relationships from the portable information carrier 2 and of loading these correspondence relationships into the second memory section 5. The portable information carrier 2 can be a magnetic strip card, a chip card or any other type of information carrier which is known per se. Reading the portable information carrier 2 can be effected by means of optical techniques, induction techniques or any other type of transmission which is known per se.

In a preferred embodiment the signal processing system in accordance with the invention also comprises set-up means 13 and write means 14. With the aid of the set-up means 13, the signal source selection device 11 and the control device 7 correspondence relationships can be set up between preset positions and signal source names and can be stored in the second memory section 5. The write means 14 can be combined with the read means 1. As a result of these steps, a user can set up correspondence relationships on a first system, write them onto the portable information carrier with the aid of the read means 14 and subsequently install them on a second system with the aid of the write means 1 of the second system.

Likewise parameter settings, such as for example volume of sound and picture brightness, can thus be exchanged between similar systems. To this end, the signal-processing system in accordance with the invention comprises means to set parameter values and assign them to a given signal source name. The parameter values can then be expressed in different protocols by translation means 15, the parameter values stored on the portable information carrier 2 being expressed in a first protocol and the parameter values stored in the second memory section 5 being expressed in a second protocol. In an alternative embodiment the parameter values stored in the second memory section 5 are expressed in the first protocol, said parameter values being translated into the second protocol when the signal source corresponding to the parameter values is selected. The interchangeability of parameter values can be improved by adapting the first protocol to a widely accepted standard.

The signal source selection device 11 can be controlled by means of the control device 7. Preset positions can be selected by a user by numerical entry, with the aid of means for selecting a logically next or a logically previous preset position, with the aid of a menu on a display screen, or with the aid of any other preset selection method which is known per se.

In a further embodiment of the signal processing system in accordance with the invention the signal processing device 8 is a CD player and the signal source selection device 11 is a track selector. The tracks on a CD form a set of signal sources. When the CD is inserted or selected the set is detected automatically in known manner with the aid of identification data on the CD. The portable information carrier 2 may include play lists for a plurality of CDs at a time. The signal source names are then formed by the track numbers, the preset positions corresponding to the positions of the tracks within a play list. A first preset position then corresponds to the first track in a play list, a second preset position to a second track etc. Thus, the preset positions are arranged in a logical sequence and can be selected with the aid of means for selecting a logically next or logically previous preset position starting from a given preset position. However, it is not necessary for the preset positions to be selectable via the control device 7 by means of numerical entry. This could be confusing for a user because in the present embodiment the signal source names are formed by the track numbers. For example, if a play list is formed by the ordered list [track 1, track 4, track 2] and the numerical entry is '2', doubt may arise whether the user wishes to select the track 4, which corresponds to the second preset position, or the track 2. For this reason, a further embodiment can utilize a method which is known per se, in accordance with which upon a numerical entry a track is selected having a track number which corresponds to the entered number, provided that the track appears in the play list. The preset position thus selected implicitly can be the first position of the selected track within the play list or, in an alternative embodiment, the next position of the selected track within the play list with respect to current preset position.

In a further embodiment the CD player can also be coupled to a display screen.

The signal source names are then constituted by the track names and on the display screen a play list is shown as a menu of track names from which a user can select a track in known manner.

The signal processing system in accordance with the invention is suitable not only for a CD player but for use in any type of apparatus for playing and, at option, recording multimedia files, which multimedia files may contain information of one or more types, such as for example sound, images, graphics and interactive functions.

The logic arrangement of the preset position can be a linear arrangement but in another embodiment it may exhibit a more complex structure, for example a hierarchical structure or a network structure. Such a structure enables, for example, radio or TV stations to be organized in categories and subcategories. In a preferred embodiment the control device 7 comprises a display screen to present this structure to a user. For this purpose, it is possible to use, for example, the display screen of a television set. A hierarchical structure can be presented on the display screen as a menu having submenus, which submenus themselves may comprise submenus in a recursive manner. In the present embodiment the control device 7 also includes means for utilizing the more complex structure, such as for example the opening of the submenus and the selection of picture elements. In the present embodiment the respective tables in the first memory section 4 and the second memory section 5 also contain information for describing the more complex structure, such as for example predefined or user-defined category names.

The invention relates to a signal processing system comprising a signal processing device (8) and a portable information carrier (2). The signal processing device comprises a signal source selection device (11) which has a plurality of preset positions (10). A preset position can be related to a signal source (9) and to a plurality of parameter values. With the aid of read means (1), write means (14) and the portable information carrier the preset positions can be exchanged between similar signal processing devices. In a first memory section (4) the signal source names are related to specific data, such as a frequency or a channel number. In a second memory section (5) and in a memory of the portable information carrier the preset positions are related to the parameter values and to signal source names which uniquely identify the signal sources within a given set of signal sources.

What is claimed is:

1. A signal processing system comprising:
   a portable information carrier;
   a signal processing device comprising:
      a signal source selection device, having a plurality of logically arranged preset positions, for selecting one broadcast signal source from at least two available broadcast signal sources,
      a control device for controlling the signal processing device and the signal source selection device,
      read means for reading information from the portable information carrier,
      a memory storing, for at least one set of signal sources, at least one correspondence relationship between a preset position and a signal source, and
   wherein the memory comprises a first and a second memory section, the first memory section storing at least one correspondence relationship between a signal source and a signal source name which identifies the signal source within a set of signal sources, and the second memory section storing at least one correspondence relationship between a preset position and signal source name,
   wherein the portable information carrier stores at least one correspondence relationship between a preset position and a signal source name, and
   the read means reads the correspondence relationships from the portable information carrier and stores the read correspondence relationships in the second memory section.

2. A signal processing system as claimed in claim 1, in which the signal from each of the signal sources has at least one controllable parameter, wherein the portable information carrier stores, for each correspondence relationship between a preset position and a signal source name, a parameter value for at least one controllable parameter, the second memory section stores, for each correspondence relationship between a preset position and a signal source, a parameter value for at least one controllable parameter, and the read means reads the parameter values from the portable information carrier and stores the read parameter values in the second memory section.

3. A signal processing system as claimed in claim 2, characterized in that the signal processing system further includes translation means for expressing a parameter value of the controllable parameter in at least two protocols, the parameter values stored on the portable information carrier being expressed in a first protocol and the parameter values stored in the second memory section being expressed in a second protocol.

4. A signal processing system as claimed in claim 1, characterized in that the signal processing system includes a television or radio receiver, the available signal sources are television or radio channels, and the first memory section stores a corresponding frequency value or a channel number for each signal source.

5. A signal processing system as claimed in claim 1, wherein the available signal sources are multimedia files, and each set of signal sources corresponds to the collection of multimedia files on a further information carrier.

6. A signal processing system as claimed in claim 1 characterized in that the signal processing system also includes a remote control device, the read means forming part of the remote control device.

7. A signal processing system as claimed in claim 1, characterized in that the signal processing system further includes:
   write means for writing information from the second memory section to the portable information carrier,
   set-up means for setting up a correspondence relationship between a preset position and signal source name and for storing this correspondence relationship in the second memory section.

8. A signal processing apparatus for use in a signal processing system as claimed in claim 1.

9. A portable information carrier for use in a signal processing system as claimed in claim 1.

10. A method of processing broadcast signals, which method includes:
   selecting a signal source from at least two available broadcast signal sources by means of logically arranged preset positions;
   reading in information from a portable information carrier; and
   uniquely identifying a signal source by means of a signal source name, wherein the information on the portable information carrier includes at least one correspondence relationship between a preset position and a signal source name.

11. A signal processing apparatus adapted to operate with a signal processing system having a portable information carrier adapted to store at least one correspondence relationship between a preset position and a signal source name, the signal processing apparatus comprising:

- a signal source selection device, having a plurality of logically arranged preset positions, for selecting one broadcast signal source from at least two available broadcast signal sources,
- a control device for controlling the signal processing device and the signal source selection device,
- read means for reading information from the portable information carrier,
- a memory storing, for at least one set of signal sources, at least one correspondence relationship between a preset position and a signal source,
- wherein the memory comprises a first and a second memory section, the first memory section storing at least one correspondence relationship between a signal source and a signal source name which identifies the signal source within a set of signal sources, and the second memory section storing at least one correspondence relationship between a preset position and a signal source name,
- and wherein the read means reads the correspondence relationships from the portable information carrier and stores the read correspondence relationships in the second memory section.

12. A portable information carrier adapted to operate with a signal processing system having a signal processing apparatus comprising:

- a signal source selection device, having a plurality of logically arranged preset positions, for selecting one broadcast signal source from at least two available broadcast signal sources,
- a control device for controlling the signal processing device and the signal source selection device,
- read means for reading information from the portable information carrier,
- a memory storing, for at least one set of signal sources, at least one correspondence relationship between a preset position and a signal source,
- wherein the memory comprises a first and a second memory section, the first memory section storing at least one correspondence relationship between a signal source and a signal source name which identifies the signal source within a set of signal sources, and the second memory section storing at least one correspondence relationship between a preset position and a signal source name,
- and wherein the portable information carrier comprises a memory for storing at least one correspondence relationship between a preset position and a signal source name,
- and wherein the read means reads the correspondence relationships from the portable information carrier and stores the read correspondence relationships in the second memory section.

* * * * *